US 8,862,973 B2

(12) United States Patent
Bains et al.

(10) Patent No.: US 8,862,973 B2
(45) Date of Patent: Oct. 14, 2014

(54) METHOD AND SYSTEM FOR ERROR MANAGEMENT IN A MEMORY DEVICE

(75) Inventors: Kuljit S. Bains, Olympia, WA (US); David J. Zimmerman, El Dorado Hills, CA (US); Dennis W. Brzezinski, Sunnyvale, CA (US); Michael Williams, Folsom, CA (US); John B. Halbert, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 686 days.

(21) Appl. No.: 12/634,286

(22) Filed: Dec. 9, 2009

(65) Prior Publication Data

US 2011/0138261 A1    Jun. 9, 2011

(51) Int. Cl.
*G06F 11/00* (2006.01)

(52) U.S. Cl.
USPC ........................................ 714/800

(58) Field of Classification Search
None
See application file for complete search history.

(56) References Cited

U.S. PATENT DOCUMENTS

| 7,161,857 | B2 | 1/2007 | Parekh |
| 7,477,522 | B2 | 1/2009 | Hazelzet |
| 7,493,531 | B2* | 2/2009 | Ito et al. ............... 714/708 |
| 2003/0163769 | A1* | 8/2003 | Phelps ................. 714/43 |
| 2004/0030737 | A1 | 2/2004 | Hassner et al. |
| 2006/0069948 | A1 | 3/2006 | Seo et al. |
| 2007/0033512 | A1 | 2/2007 | Johnson |
| 2007/0226579 | A1 | 9/2007 | Alexander et al. |
| 2008/0002590 | A1 | 1/2008 | Thomas et al. |
| 2008/0155378 | A1* | 6/2008 | Amidi ..................... 714/764 |
| 2008/0195922 | A1 | 8/2008 | Lee |
| 2009/0158122 | A1 | 6/2009 | Gagnon |
| 2011/0055671 | A1* | 3/2011 | Kim et al. ................. 714/800 |
| 2013/0117641 | A1 | 5/2013 | Bains et al. |
| 2013/0304981 | A1 | 11/2013 | Paz |
| 2013/0314429 | A1 | 11/2013 | Croxford et al. |

FOREIGN PATENT DOCUMENTS

| CN | 101206703 | 6/2008 |
| CN | 101303716 | 11/2008 |
| WO | WO-2004/107175 | 12/2004 |
| WO | 2009017991 | 2/2009 |

OTHER PUBLICATIONS

DDR3 SDRAM Standard, JEDEC Standard, Sep. 2009, 220 pages, JEDEC Solid State Technology Association 2009, Arlington, VA.
Search and Examination Report for United Kingdom Patent Application No. GB1018116.2, Mailed Feb. 14, 2011, 6 pages.
Office Action 2 for GB Application No. 1018116.2, dated May 31, 2012, 3 pp. [77.249GB (OA2)].
Office Action 1 for CN Application No. 201010592177.7, dated Jul. 31, 2012, 16 pp. [77.249CN (OA1)].

(Continued)

*Primary Examiner* — Christopher McCarthy
(74) *Attorney, Agent, or Firm* — Kathy Ortiz

(57) ABSTRACT

A method and system for error management in a memory device. In one embodiment of the invention, the memory device can handle commands and address parity errors and cyclic redundancy check errors. In one embodiment of the invention, the memory can detect whether a received command has any parity errors by determining whether the command bits or the address bits of the received command has any parity errors. If a parity error or cyclic redundancy check error in the received command is detected, an error handling mechanism is triggered to recover from the errant command.

29 Claims, 5 Drawing Sheets

(56) References Cited

OTHER PUBLICATIONS

Response to Office Action 1 for GB Application No. 1018116.2, dated Feb. 9, 2012, 18 pp. [77.249GB (ROA1)].
Response to Office Action 1 for GB Application No. 1203788.3, dated Nov. 27, 2012, 10 pp. [77.249GBD1 (ROA1)].
Response to Office Action 2 for GB Application No. 1018116.2, dated Jul. 23, 2012, 3 pp. [77.249GB (ROA2)].
Search Report and Office Action 1 for GB Application No. 1203788.3, dated May 31, 2012, 5 pp. [77.249GBD1 (SR & OA1)].
Office Action Received for Chinese Patent Application No. 201010592177.7, mailed on Jan. 21, 2013, 8 pages of Chinese Office Action and 15 pages of English Translation.
Office Action Received for United Kingdom Patent Application No. GB1018116.2, mailed on Feb. 19, 2013, 1 page of Office Action only.
Office Action Received for Chinese Patent Application No. 201010592177.7, mailed on Aug. 08, 2013, 9 pages of Chinese Office Action and 16 pages of English Translation.
Combined Search and Examination Report for United Kingdom Patent Application No. 1308311.8, Mailed on Sep. 27, 2013, 5 pages.
Examination Report received for United Kingdom Patent Application No. GB1018116.2, mailed on Jun. 25, 2013, 5 pages.
Office Action received for United Kingdom Patent Application No. 1308311.8, mailed on Jun. 25, 2013, 2 pages.
Response to Office Action 1 for CN Application No. 201010592177.7, dated Dec. 12, 2012, 14 pp. (w/ English Translation of Claims) [77249CN (ROA1)].
Response to Office Action 2 for CN Application No. 201010592177.7, dated Apr. 3, 2013, 14 pp. (w/ English Translation of Claims) [77.249CN (ROA2)].
Response to Office Action 3 for CN Application No. 201010592177.7, dated Oct. 23, 2013, 14 pp. (w/ English Translation of Claims) [77.249CN (ROA3)].
Final Office Action 1 for CN Application No. 201010592177.7, dated Mar. 4, 2014, 23 pp. (w/ English Translation) [77.249CN (FOA1)].
Response to Office Action 3 for GB Application No. 1018116.2, dated May 13, 2013, 17 pp. [77.249GB (ROA3)].
Response to Office Action 4 for GB Application No. 1018116.2, dated Oct. 25, 2013, 18 pp. [77.249GB (ROA4)].
Office Action 5 for GB Application No. 1018116.2, dated Dec. 19, 2013, 2 pp. [77.249GB (OA5)].
Response to Office Action 5 for GB Application No. 1018116.2, dated Apr. 4, 2014, 4 pp. [77.249GB (ROA5)].
Notice of Allowance for GB Application No. 1203788.3, dated Mar. 26, 2013, 2 pp. [77.249GBD1 (NOA1)].
Response to Office Action 1 for GB Application No. 1308311.8, dated Jul. 24, 2013, 8 pp. [77.249GBD2 (ROA1)].
Response to Office Action 2 for GB Application No. 1308311.8, dated Feb. 18, 2014, 7 pp. [77.249GBD2 (ROA2)].
Office Action 3 for GB Application No. 1308311.8, dated Mar. 4, 2014, 3 pp. [77.249GBD2 (OA3)].
Response to Office Action 3 for GB Application No. 1308311.8, dated Mar. 31, 2014, 6 pp. [77.249GBD2 (ROA3)].
Office Action 1 for GB Application No. 1402999.5, dated Mar. 3, 2014, 2 pp. [77.249GBD3 (OA1)].
Response to Office Action 1 for GB Application No. 1402999.5, dated Apr. 8, 2014, 6 pp. [77.249GBD3 (ROA1)].
Office Action 2 for GB Application No. 1402999.5, dated May 6, 2014, 2 pp. [77.249GBD3 (OA2)].
Office Action 1 for TW Application No. 099135757, dated Mar. 25, 2014, 14 pp. (w/ English Translation) [77.249TW (OA1)].
Examination Report for United Kingdom Patent Application No. 1402999.5, mailed Jun. 6, 2014, 6 pages.

* cited by examiner

| 210<br>C/A parity (Wr) | 215<br>CRC error (Wr) | 220<br>Error status<br>(Rd / Wr) | 225<br>CRC error status<br>(Rd / Wr) | 230<br>Error log (Rd) |
|---|---|---|---|---|
| 0 = Disable<br>1 = Enable | 0 = Disable<br>1 = Enable | 0 = No error<br>1 = Error | 0 = No error<br>1 = Error | Errant C/A frame |

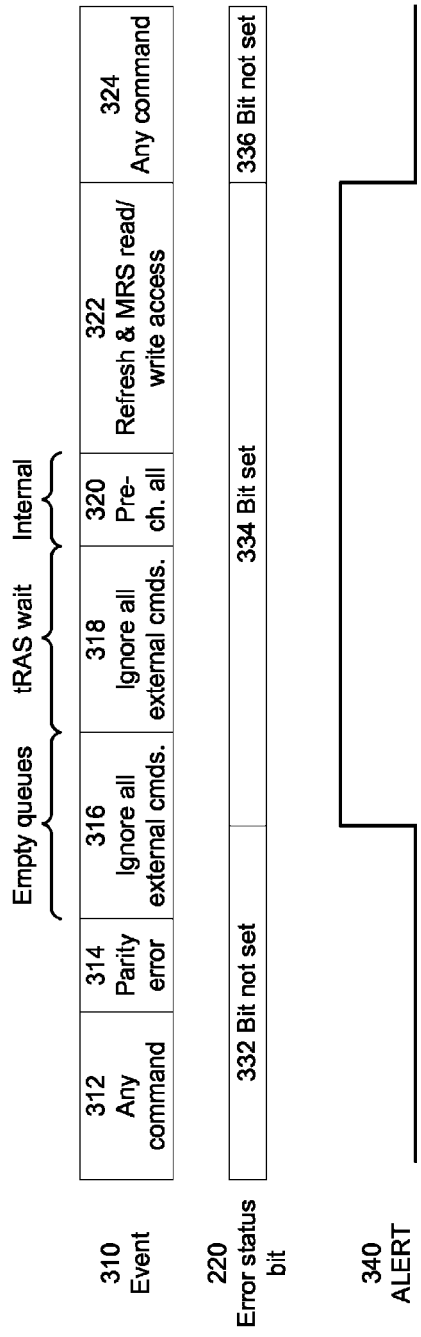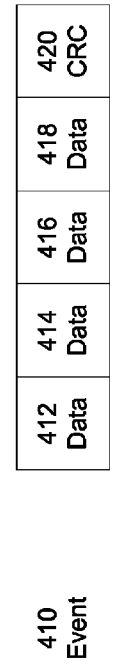
FIG. 3
FIG. 4

METHOD AND SYSTEM FOR ERROR MANAGEMENT IN A MEMORY DEVICE

FIELD OF THE INVENTION

This invention relates to a memory device, and more specifically but not exclusively, to the error management of errors such as command and/or address parity errors and cyclic redundancy check errors in the memory device.

BACKGROUND DESCRIPTION

In a typical computer system, a memory controller facilitates the access of one or more memories in the computer system. In a scenario where the communication between memory controller and the memories is corrupted, the memories may receive an errant command. This results in the corruption of the data in the memories as the memories do not have any mechanism to detect errant commands and will perform all write operations. In order to recover from the errant command, the computer system needs to reboot. This affects the performance of the computer system and critical data may be lost.

BRIEF DESCRIPTION OF THE DRAWINGS

The features and advantages of embodiments of the invention will become apparent from the following detailed description of the subject matter in which:

FIG. 3 illustrates a sequence of handling parity errors in a memory module in accordance with one embodiment of the invention;

FIG. 4 illustrates a sequence of handling cyclic redundancy check errors in a memory module in accordance with one embodiment of the invention;

DETAILED DESCRIPTION

Figures 1, 2:
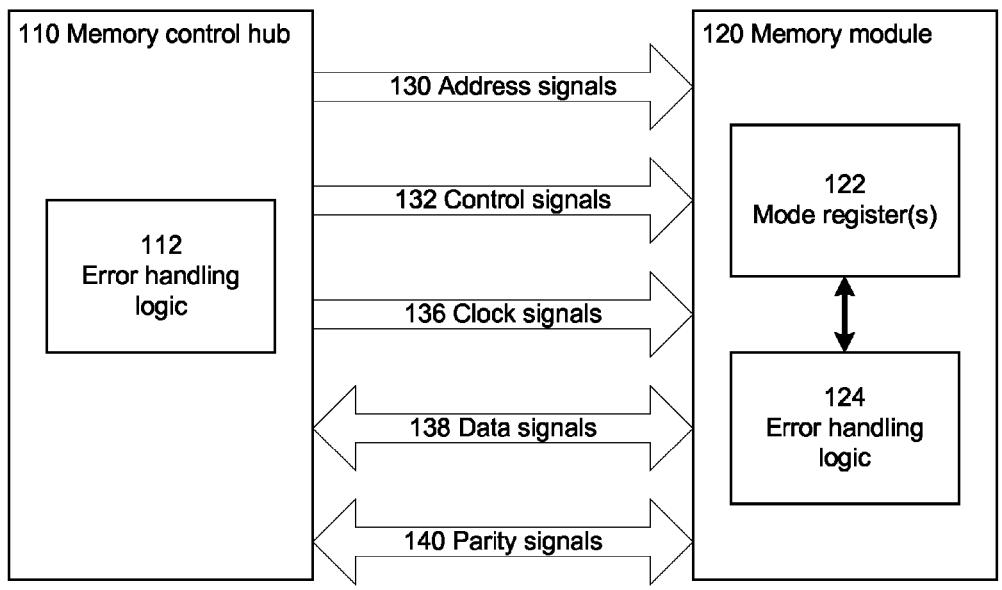
FIG. 1 illustrates a block diagram of a memory control hub and a memory module in accordance with one embodiment of the invention.
FIG. 2 illustrates a format of a mode register in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and system for error management in a memory device. In one embodiment of the invention, the memory device can handle commands and address parity errors and cyclic redundancy check errors. In one embodiment of the invention, the memory can detect whether a received command has any parity errors by determining whether the command bits or the address bits of the received command has any parity errors. If a parity error in the received command is detected, an error handling mechanism is triggered to recover from the errant command.

With command/address (C/A) parity support in the memory device, the performance of a system utilizing the memory device can be improved. The system does not need to reboot in order to recover from an errant command received by the memory device. In one embodiment of the invention, the memory device includes but is not limited to, a Synchronous Dynamic Random Access Memory (SDRAM), Dynamic Random Access Memory (DRAM), RAMBUS Dynamic Random Access Memory (RDRAM), double-data-rate three SDRAM (DDR3), DDR four SDRAM (DDR4), and any other type of random access memory device.

FIG. 1 illustrates a block diagram 100 of a memory control hub 110 and a memory module 120 in accordance with one embodiment of the invention. In one embodiment of the invention, the memory module 120 includes, but is not limited to, DRAMs, register devices, buffer devices. The memory control hub 110 has an error handling logic 112 to handle commands and address parity errors when the memory module 120 receives an errant command. The memory control hub 110 communicates with the memory module 120 using signals including, but not limited to, address signals 130, control signals 132, clock signals 136, data signals 138, parity signals 140 and any other signals to facilitate communication between the memory control hub 110 and the memory module 120.

In one embodiment of the invention, when the memory control hub 110 is required to send a command to the memory module 120, the error handling logic 112 in the memory control hub 110 computes the parity of the address signal bits and the command signal bits of the command. A parity bit signal is selected or determined based on an even or odd parity of a combination of the computed parity and the parity bit signal. In one embodiment of the invention, the error handling logic 112 covers the parity for the signals including but not limited to, row address strobe (RAS) signal, column address strobe (CAS) signal, write enable (WE) signal, address bus signals, and bank select signals of the memory module 120.

The memory control hub 110 provides the parity bit signal as one of the parity signals 140 when a command is sent to the memory module 120. In one embodiment of the invention, the memory module 120, upon receiving a command and its associated parity signal, is able to detect or determine if the received command has any C/A parity error. In another embodiment of the invention, the memory module 120 is able to detect or determine if the received command has any cyclic redundancy check (CRC) error. The memory module 120 has an error handling logic 124 to perform the C/A parity or CRC error detection.

If the memory module 120 detects a parity error in the received command, it ignores the received command and stores the command bits and address bits of the received command in a mode register 122 in one embodiment of the invention. The memory module 120 asserts an indication signal as one of the parity signals 140 to the memory control hub 110 when the parity error in the received command is detected. Similarly, when a CRC error in the received command is detected, the memory module 120 asserts the indication signal as one of the parity signals 140 to the memory control hub 110.

The memory controller hub 110, upon receiving the indication signal, determines from the indication signal whether a parity or a CRC error is present in the received command. The memory controller hub 110 performs an appropriate recovery mechanism to recover from the parity or CRC error. With the error handling logic 112 in the memory control hub 110, it has hooks to recover from errors in the memory module 120.

One of ordinary skill in the relevant art will readily appreciate that other forms of error detection mechanisms can be implemented without affecting the workings of the invention. In another embodiment of the invention, more than one memory module 120 or memory control hub 110 is present in a system. The memory control hub 110 is integrated into a processor of the system in another embodiment of the invention.

FIG. 2 illustrates a format 200 of a mode register 122 in accordance with one embodiment of the invention. The mode register 122 has a C/A parity bit 210 and a CRC error bit 215 that can only be written or set by the memory control hub 110. The C/A parity bit 210 allows the activation or deactivation of the parity checks of the memory module 120. The CRC error bit 215 allows the activation or deactivation of a CRC indication pulse when CRC errors are detected in the memory module 120. When the C/A parity bit 210 is asserted or set to logic one, the error handling logic 124 of the memory module 120 is enabled. When the C/A parity bit 210 is de-asserted or set to logic zero, the error handling logic 124 of the memory module 120 is disabled.

The mode register 122 has an error status bit 220 and a CRC error status bit 225 that can be read and written. When a parity error is detected by the memory module 120, the memory module asserts or sets the error status bit 220 to logic one. When a CRC error is detected by the memory module 120, the memory module asserts or sets the CRC error status bit 225 to logic one. When the memory control hub 110 has completed the recovery mechanism or process for the parity or CRC error, it de-asserts or sets the error status bit 220 or CRC error status bit 225 respectively to logic zero.

When the memory module 120 detects a parity error in a received command, the memory module 120 stores the command bits and address bits of the received command in the error log bits 230 of the mode register 122. The memory control hub 110 can read the error log bits 230 to determine which command has been received with parity errors by the memory module 120.

The format 200 of the mode register 122 illustrates one configuration in one embodiment of the invention and is not meant to be limiting. One of ordinary skill in the relevant art will readily appreciate that other variations of the configuration of the mode register 122 can be used without affecting the workings of the invention. In one embodiment of the invention, the mode register 122 is part of a mode register set (MRS) register on a DRAM device.

FIG. 3 illustrates a sequence 300 of handling parity errors in a memory module 120 in accordance with one embodiment of the invention. The events 310 show a possible sequence 300 of events when the memory module 120 receives a command with a parity error. In event 312, the memory module 120 is responding to all commands with a valid or correct parity bit signal. The error status bit 220 and the ALERT signal 340 are not set or asserted during the event 312. This is illustrated in the event bit not set 332. The ALERT signal 340 is an indication signal to the memory control hub 110 that the memory module 120 has received a command with a parity error. In one embodiment of the invention, the ALERT signal is a OR signal that is connected to all memory modules in a system.

In the event 314, the memory module 120 detects or determines that it have received a command with incorrect parity. In the event 316, the memory module 120 ignores the command with incorrect parity and all other external commands. The memory module 120 stores the errant command and address in the error log bits 230 and asserts the error status bit 220. This is illustrated in the event bit set 334. The ALERT signal 340 is asserted when the error status bit 220 is asserted. In the event 316, the memory module 120 empties the queue of pending valid commands that have been received prior to the received errant command, i.e., the memory module 120 waits for all of the pending valid commands to finish execution.

In the event 318, the memory module 120 waits for an active-to-precharge command delay (tRAS) to lapse. The tRAS delay is the number of clock cycles required between a bank active command and issuing the precharge command. In one embodiment of the invention, the memory module 120 waits for the minimum delay time required for tRAS. When the tRAS delay has lapsed, the memory module 120 closes all open pages if there are any.

In the event 320, the memory module 120 issues an internal precharge command to all banks of the memory module 120. In the event 322, the memory module 120 responds to refresh commands and mode register set (MRS) read and write commands from the memory controller hub 110. The memory module 120 does not respond to any other commands in event 322 when the error status bit 220 is asserted. The refresh commands include but are not limited to, refresh-all commands and refresh-group commands.

In event 324, the memory controller hub 110 has completed its error handling recovery process and de-asserts the error status bit 220 using a MRS write command to the mode register 122. The memory module 120 resumes its normal operation and responds to all commands with valid parity. The ALERT signal 340 is de-asserted when the error status bits 220 is de-asserted. This is illustrated in the event bit not set 336.

FIG. 4 illustrates a sequence 400 of handling CRC errors in a memory module 120 in accordance with one embodiment of the invention. The CRC error mechanism shares the same ALERT signal 340 in one embodiment of the invention. In order to determine between CRC errors and parity errors, the memory control hub 110 needs to read the error status bit 220 of each memory module. This is time consuming and reduces the efficiency of the system.

To overcome this problem, the events 410 show a possible sequence 400 of events when the memory module 120 is writing data with a CRC error. In the events 412 to 418, the memory module 120 has written data in response to a write operation. The error status bit 220 and the ALERT signal 440 are not set or asserted during the events 412 to 418. In the event 420, the memory module receives the CRC for the written data and it checks if the written data is correct based on the CRC. When a CRC error is detected or determined, the memory module 120 sets the error status bit 220 in the event 432. The memory module 120 sends a pulse on the ALERT signal 440 to indicate to the memory control hub 110 that a CRC error has been detected.

The memory control hub 110 can easily differentiate between a CRC error or a parity error from the memory module 120 by examining the ALERT signal 440. The number of clock cycles or width of the pulse can be set to any suitable number that the memory control hub is able to detect. In one embodiment of the invention, the pulse width of the ALERT signal 440 is set to two clock cycles when a CRC error is detected by the memory module 120. One of ordinary skill in the relevant art will readily appreciate that other variations of indicating the CRC error to the memory control hub 110 can be used without affecting the workings of the invention.

Figure 5:
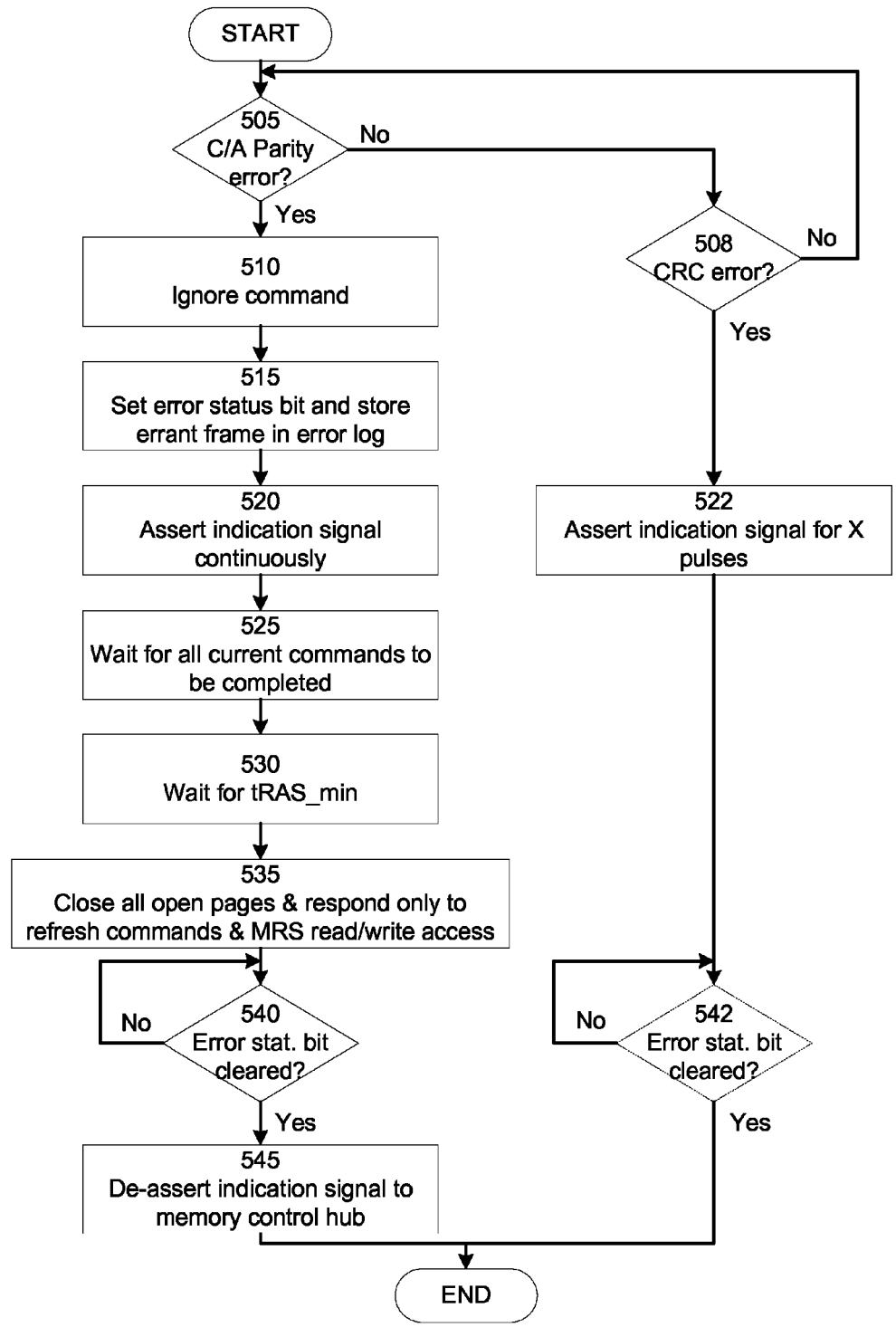
FIG. 5 illustrates a flow chart of the steps to perform error management in a memory module in accordance with one embodiment of the invention.

FIG. 5 illustrates a flow chart 500 of the steps to perform error management in a memory module 120 in accordance with one embodiment of the invention. For clarity of illustration, FIG. 5 is discussed with reference to FIG. 1. In step 505, the memory module 120 checks if there are any C/A parity error in any received command, where the received command is qualified by a chip select (CS) signal. If there is no C/A parity error, the memory module 120 checks if there is any CRC error in step 508. If there is no CRC error, the memory module 120 goes back to step 505. If there is a CRC error, the memory module 120 asserts an indication signal for X pulses in step 522.

The number X can be any suitable number that allows the memory control hub 110 to differentiate between a parity error and a CRC error. The width of the X pulses can also be varied in one embodiment of the invention. In optional step 542, the memory module checks if the error status bit 220 is cleared or de-asserted by the memory control hub 110. The memory control hub 110 clears the error status bit 220 after it has finished the error recovery for the errant command. If the error status bit 220 is cleared, the flow ends. If the error status bit 220 is not cleared, the memory module 120 goes back to step 542.

If there is a C/A parity error, the memory module 120 ignores the received command with the C/A parity error in step 510. The memory module ignores all other external commands in step 510. In step 515, the memory module 120 sets or asserts the error status bit 220 and stores the errant command frame in the error log bits 230. In step 520, the memory module 120 asserts an indication signal continuously. In one embodiment of the invention, the indication signal is the ALERT signal 340. In step 525, the memory module 120 waits for all current commands to be completed. The current commands are received prior to the errant command.

In step 530, the memory module 120 waits the minimum active-to-precharge command delay (tRAS_min) to lapse. In step 535, the memory module 120 closes all open memory pages and responds only to refresh commands and MRS read/write commands from the memory control hub 110. In step 540, the memory module 120 checks if the error status bit 220 is cleared by the memory control hub 110. The memory control hub 110 clears the error status bit 220 after it has finished the error recovery for the errant command. If the error status bit 220 is cleared or de-asserted, the memory module 120 de-asserts the indication signal in step 545 and the flow ends. If the error status bit 220 is not cleared, the memory module 120 goes back to step 540.

Figure 6:
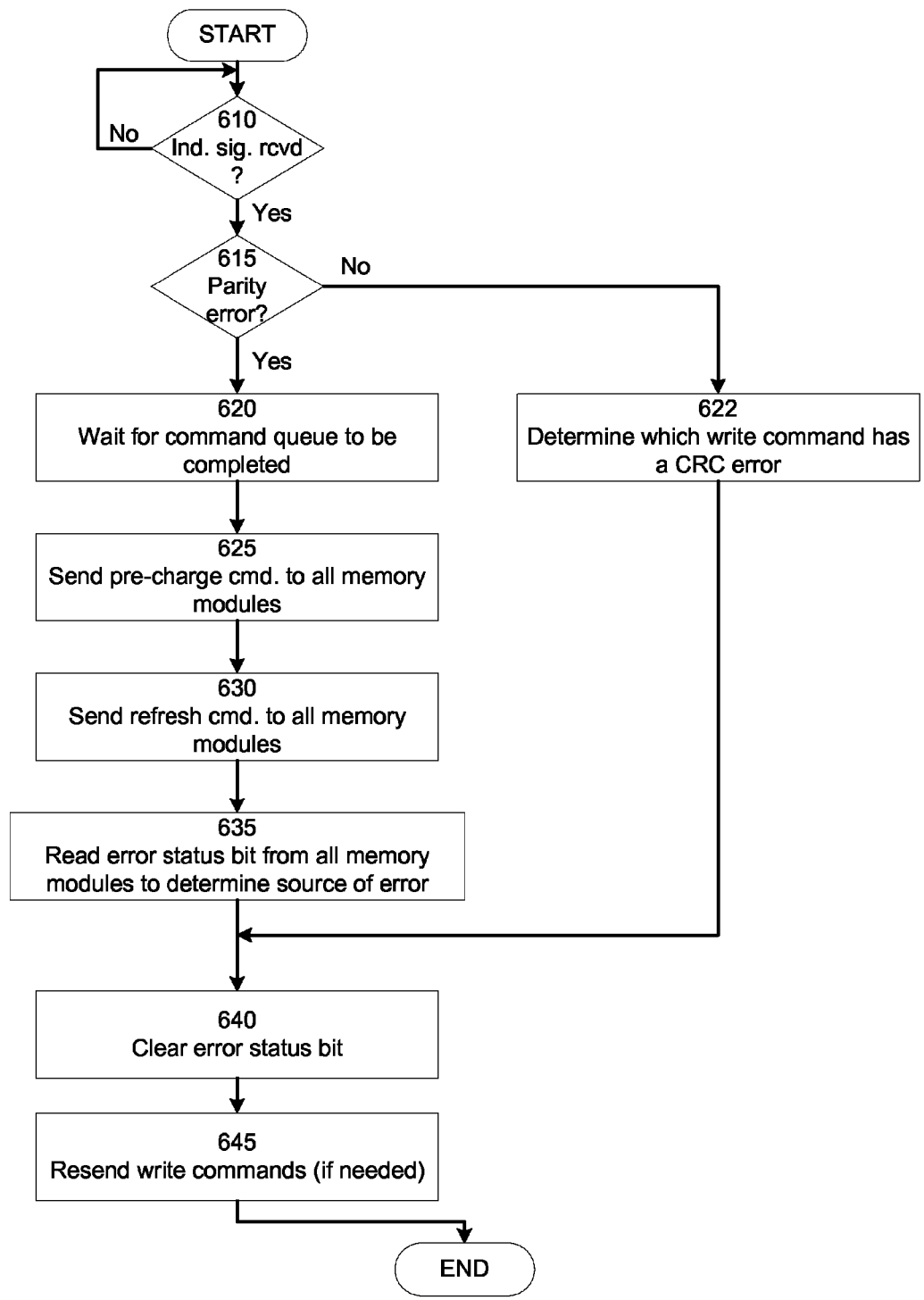
FIG. 6 illustrates a flow chart of the steps to perform error management in a memory controller hub in accordance with one embodiment of the invention.

FIG. 6 illustrates a flow chart 600 of the steps to perform error management in a memory controller hub 110 in accordance with one embodiment of the invention. For clarity of illustration, FIG. 6 is discussed with reference to FIG. 1. In step 610, the memory control hub 110 checks if it has received any indication signal. In one embodiment of the invention, the indication signal is the ALERT signal 340. If no indication signal is received, the memory control hub 110 goes back to step 610. If an indication signal is received, the memory control hub 110 checks if the indication signal indicates a parity error in step 615. If the indication signal has indicated a parity error, the memory control hub 110 waits for the current command queue to be completed in step 620.

In step 625, the memory control hub 110 sends a precharge command to all memory modules. All memory modules, except the memory module that has a parity error, execute or perform the precharge command from the memory control hub 110. In step 630, the memory control hub 110 sends a refresh command to all the memory modules to retain the data in each memory module. All memory modules, including the memory module that has a parity error, execute or perform the refresh command from the memory control hub 110.

In step 635, the memory control hub 110 reads the error status bit 220 from each memory module to determine which memory module is the source of the error. For example, in one embodiment of the invention, the memory control hub 110 is connected to four memory modules. The memory control hub 110 reads the error status bit 220 from each of the four memory modules to determine which of the four memory modules has received a command with a C/A parity error.

In step 640, the memory control hub 110 clears the error status bit 220 from the memory module that has received the command with a C/A parity error. In step 645, the memory control hub 110 resends the write command (if needed) to the memory module that has received the command with a C/A parity error and the flow ends.

In step 615, if there is no parity error detected in the indication signal, it means that a CRC error has been detected and the flow goes to optional step 622. For purposes of illustration, the memory control hub 110 is able to detect either a parity error or a CRC error. In optional step 622, the memory module determines which of the memory modules has received a write command with a CRC error. In one embodiment of the invention, the memory control hub 110 detects or determines which of the memory modules has received a write command with a CRC error by examining the timing of the indication signal and the propagation delay of the indication signal. In another embodiment of the invention, step 622 is not performed and the memory control hub 110 handles CRC error by backing up write commands to a certain point which assumes that the furthest DRAM device has the CRC error and then resends all the write commands from that point on. The worst case latency for the ALERT signal can be determined as part of training before using the memory channel for write commands.

Figure 7:
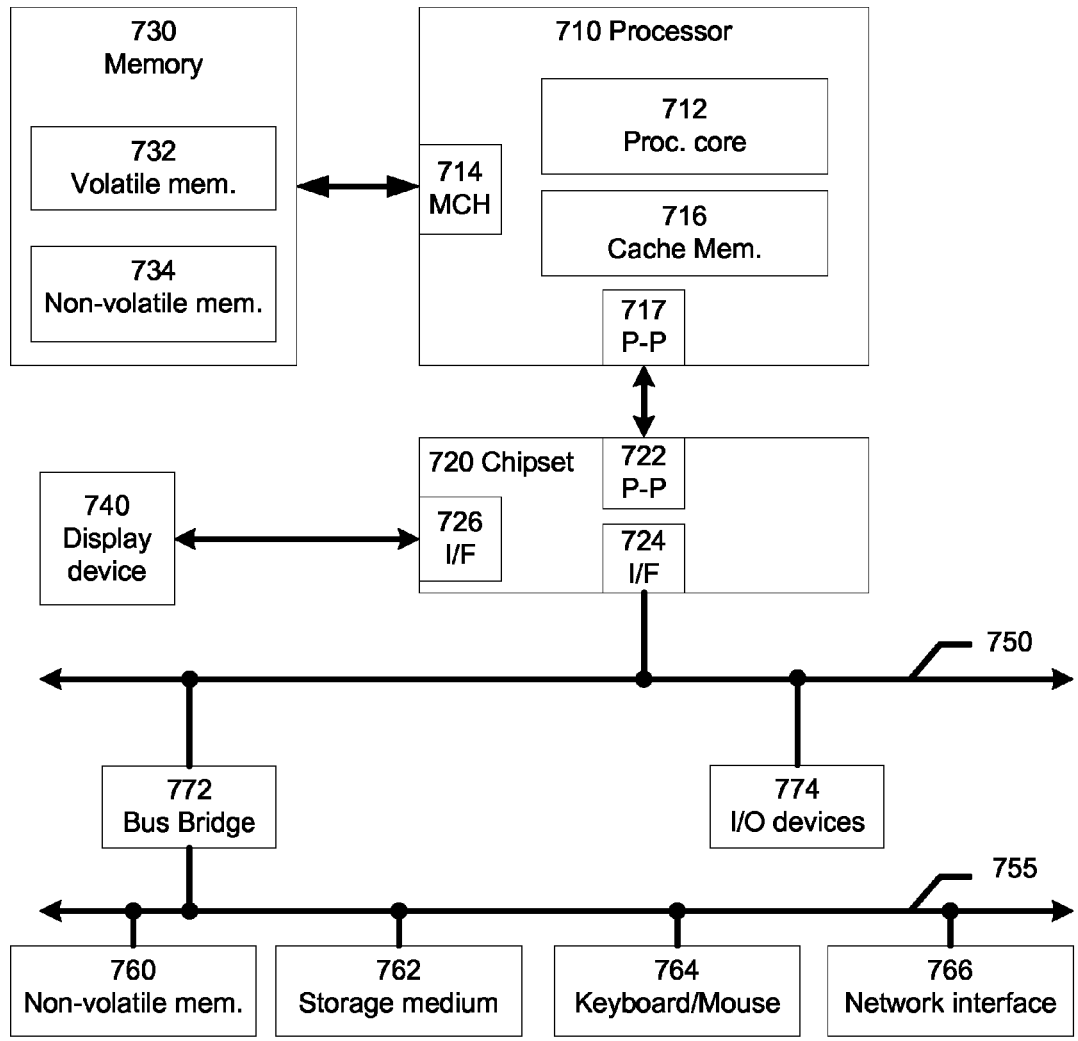
FIG. 7 illustrates a system to implement the methods disclosed herein in accordance with one embodiment of the invention.

FIG. 7 illustrates a system 700 to implement the methods disclosed herein in accordance with one embodiment of the invention. The system 700 includes, but is not limited to, a desktop computer, a laptop computer, a netbook, a notebook computer, a personal digital assistant (PDA), a server, a workstation, a cellular telephone, a mobile computing device, an Internet appliance or any other type of computing device. In another embodiment, the system 700 used to implement the methods disclosed herein may be a system on a chip (SOC) system.

The processor 710 has a processing core 712 to execute instructions of the system 700. The processing core 712 includes, but is not limited to, pre-fetch logic to fetch instructions, decode logic to decode the instructions, execution logic to execute instructions and the like. The processor 710 has a cache memory 716 to cache instructions and/or data of the system 700. In another embodiment of the invention, the cache memory 716 includes, but is not limited to, level one, level two and level three, cache memory or any other configuration of the cache memory within the processor 710.

The memory control hub (MCH) 714 performs functions that enable the processor 710 to access and communicate with a memory 730 that includes a volatile memory 732 and/or a non-volatile memory 734. The volatile memory 732 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 734 includes, but is not limited to, NAND flash memory, phase change memory (PCM), read only memory (ROM), electrically erasable programmable read only memory (EEPROM), or any other type of non-volatile memory device.

The memory 730 stores information and instructions to be executed by the processor 710. The memory 730 may also stores temporary variables or other intermediate information while the processor 710 is executing instructions. The chipset 720 connects with the processor 710 via Point-to-Point (PtP) interfaces 717 and 722. The chipset 720 enables the processor 710 to connect to other modules in the system 700. In one embodiment of the invention, the interfaces 717 and 722 operate in accordance with a PtP communication protocol such as the Intel® QuickPath Interconnect (QPI) or the like.

The chipset 720 connects to a display device 740 that includes, but is not limited to, liquid crystal display (LCD), cathode ray tube (CRT) display, or any other form of visual display device. In one embodiment of the invention, the processor 710 and the chipset 720 are merged into a SOC. In addition, the chipset 720 connects to one or more buses 750 and 755 that interconnect the various modules 774, 760, 762, 764, and 766. Buses 750 and 755 may be interconnected together via a bus bridge 772 if there is a mismatch in bus speed or communication protocol. The chipset 720 couples with, but is not limited to, a non-volatile memory 760, a mass storage device(s) 762, a keyboard/mouse 764 and a network interface 766.

The mass storage device 762 includes, but is not limited to, a solid state drive, a hard disk drive, an universal serial bus flash memory drive, or any other form of computer data storage medium. The network interface 766 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 7 are depicted as separate blocks within the system 700, the functions performed by some of these blocks may be integrated within a single semiconductor circuit or may be implemented using two or more separate integrated circuits. For example, although the cache memory 716 is depicted as a separate block within the processor 710, the cache memory 716 can be incorporated into the processor core 712 respectively. The system 700 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method comprising:
   receiving by a memory device, a command and a parity bit signal associated with the command;
   detecting whether the received command has a parity error; and
   receiving by the memory device one or more subsequent commands during a first interval after the received command; and
   responsive to a detection of the parity error of the received command,
   ignoring the received command;
   storing command bits and address bits of the received command;
   ignoring the one or more subsequent commands received in the first interval;
   asserting an error indication signal;
   asserting an error status bit;
   waiting until all of one or more current commands has finished execution,
   wherein the one or more current commands are received prior to the received command;
   waiting until an active-to-precharge command delay has lapsed; and
   closing all open pages.

2. The method of claim 1, wherein detecting whether the received command has the parity error comprises:

determining whether the command bits or the address bits of the received command has the parity error.

3. The method of claim 1, wherein responsive to the detection of the parity error and during a second interval subsequent to the first interval, the method further comprising:
responding only to one of a refresh command, a mode register set (MRS) read command or a MRS write command.

4. The method of claim 3, wherein responsive to the detection of the parity error, the method further comprising:
determining that the error status bit is de-asserted;
de-asserting the indication signal.

5. The method of claim 1, further comprising:
detecting whether a write operation has a cyclic redundancy check (CRC) error; and
responsive to a detection of the CRC error, sending a pulse on the indication signal.

6. A method comprising:
detecting whether a parity error or a cyclic redundancy check (CRC) error is indicated on an indication signal; and
responsive to a detection of the parity error, waiting until all of one or more sent commands has completed execution;
sending a pre-charge command and a refresh command to all of one or more memory modules; and
determining which one of the one or more memory modules has received a command with the parity error.

7. The method of claim 6, wherein detecting whether the parity error or the CRC error is indicated on the indication signal comprises:
determining whether an asserted signal or a pulse is sent on the indication signal.

8. The method of claim 6, wherein determining which one of the one or more memory modules has received the command with the parity error comprises:
reading an error status bit of each of the one of more memory modules to determine which one of the one or more memory modules has received the command with the parity error, wherein the error status bit is to indicate the parity error.

9. The method of claim 8, wherein responsive to a detection of the parity error, the method further comprising:
resetting the error status bit of the determined one memory module; and
sending the command to the determined one memory module.

10. The method of claim 6, further comprising:
responsive to a detection of the CRC error, determining which one of the one or more memory modules has performed a write operation with the CRC error; and
performing the write operation to the determined one memory module that has performed the write operation with the CRC error.

11. The method of claim 10, wherein determining which one of the one or more memory modules has performed the write operation with the CRC error comprises:
determining which one of the one or more memory modules has performed a write operation with the CRC error based on a delay time of the indication signal.

12. A device, the device comprising a memory module, the memory module comprising:
a register; and
error handling logic to:
receive a command, and a parity bit signal associated with the command, and one or more subsequent commands during a first interval after the received command;
detect whether the received command has a parity error; and
responsive to a detection of the parity error of the received command,
ignore the received command;
store command bits and address bits of the received command in the register;
ignore the one or more subsequent commands received in the first interval;
assert an error indication signal;
assert an error status bit of the register;
wait until all of one or more current commands have finished execution, wherein the one or more current commands are received prior to the received command;
wait until an active-to-precharge command delay has lapsed; and
close all open pages.

13. The device of claim 12, wherein the error handling logic to detect whether the received command has the parity error is to:
determine whether the command bits or the address bits of the received command has the parity error.

14. The device of claim 12, wherein the error handling logic responsive to the detection of the parity error and during a second interval subsequent to the first interval, is further to:
respond only to one of a refresh command, a mode register set (MRS) read command or a MRS write command.

15. The device of claim 12, wherein the error handling logic responsive to the detection of the parity error is further to:
determine that the error status bit is de-asserted;
de-assert the indication signal.

16. The device of claim 12, wherein the error handling logic is further to:
detect whether a write operation has a cyclic redundancy check (CRC) error; and
responsive to a detection of the CRC error, send a pulse on the indication signal.

17. The device of claim 12, wherein the memory module is a double-data-rate four synchronous dynamic random access memory (DDR4 SDRAM).

18. The device of claim 12 further comprising a memory controller, the memory controller comprising:
logic to perform tasks, to:
provide a command and a parity bit signal associated with the command to a plurality of memory modules;
detect whether an indication of a parity error of the command is received; and
responsive to a detection of the indication of the parity error, determine which one of the plurality of memory modules has received the command,
wherein the logic comprises at least one of hardware adapted to perform the tasks,
and a combination of hardware and software adapted to perform the tasks, said combination of hardware and software including machine readable instructions stored on the hardware of the combination that when executed, causes the machine to perform the tasks.

19. The device of claim 18, wherein the logic to provide the parity bit signal associated with the command is to:
compute parity of address signals and command signals of the command; and
select a bit signal as the provided parity bit signal associated with the command, wherein the bit signal is selected based on an even or odd parity of a combination of the computed parity and the bit signal.

20. The device of claim 18, wherein the logic responsive to the detection of the indication of the parity error is further to:
- wait until all of one or more sent commands to the plurality of one or more memory modules have completed execution; and
- send a pre-charge command and a refresh command to all memory modules.

21. The device of claim 18, wherein the logic to determine which one of the plurality of memory modules has received the command is to:
- reading an error status bit of each of the plurality of memory modules to determine which one of the plurality of memory modules has received the command, wherein the error status bit is to indicate the parity error.

22. The device of claim 21, wherein the logic responsive to the detection of the indication of the parity error is further to:
- reset the error status bit of the determined one memory module; and
- send the command to the determined one memory module.

23. The device of claim 18, wherein the logic is further to:
- detect whether another indication of a cyclic redundancy check (CRC) error of the command is received; and
- responsive to a detection of the another indication of the CRC error,
- determine which one of the plurality of memory modules has received the command; and
- send the command to the determined one memory module.

24. A memory controller comprising:
- logic to perform tasks, to:
  - detect whether a parity error or a cyclic redundancy check (CRC) error is indicated on an indication signal; and
  - responsive to a detection of the parity error, wait until all of one or more sent commands has completed execution;
  - send a pre-charge command and a refresh command to all of one or more memory devices; and
  - determine which one of the one or more memory devices has received a command with the parity error.

25. The memory controller of claim 24, wherein the logic to detect whether the parity error or the CRC error is indicated on the indication signal is to:
- determine whether an asserted signal or a pulse is sent on the indication signal.

26. The memory controller of claim 24, wherein the logic to determine which one of the one or more memory devices has received the command with the parity error is to:
- read an error status bit of each of the one or more memory devices to determine which one of the one or more memory devices has received the command with the parity error, wherein the error status bit is to indicate the parity error.

27. The memory controller of claim 24, wherein responsive to a detection of the parity error, the logic is to:
- reset the error status bit of the determined one memory device; and
- send the command to the determined one memory device.

28. The memory controller of claim 24, further comprising:
- responsive to a detection of the CRC error, the logic is to determine which one of the one or more memory devices has performed a write operation with the CRC error; and
- to perform the write operation to the determined one memory device that has performed the write operation with the CRC error.

29. The memory controller of claim 24, wherein the logic to determining which one of the one or more memory modules has performed the write operation with the CRC error is to:
- determine which one of the one or more memory modules has performed a write operation with the CRC error based on a delay time of the indication signal.

* * * * *